US011188766B2

United States Patent
Rahimpour et al.

(10) Patent No.: US 11,188,766 B2
(45) Date of Patent: Nov. 30, 2021

(54) SYSTEM AND METHOD FOR PROVIDING CONTEXT AWARE ROAD-USER IMPORTANCE ESTIMATION

(71) Applicant: Honda Motor Co., Ltd., Tokyo (JP)

(72) Inventors: Alireza Rahimpour, Palo Alto, CA (US); Sujitha Catherine Martin, Sunnyvale, CA (US); Ashish Tawari, Santa Clara, CA (US); Hairong Qi, Knoxville, TN (US)

(73) Assignee: HONDA MOTOR CO., LTD., Tokyo (JP)

(*) Notice: Subject to any disclaimer, the term of this patent is extended or adjusted under 35 U.S.C. 154(b) by 237 days.

(21) Appl. No.: 16/542,662

(22) Filed: Aug. 16, 2019

(65) Prior Publication Data

US 2020/0250437 A1 Aug. 6, 2020

Related U.S. Application Data

(60) Provisional application No. 62/801,321, filed on Feb. 5, 2019.

(51) Int. Cl.
*G06K 9/00* (2006.01)
*G05D 1/02* (2020.01)
(Continued)

(52) U.S. Cl.
CPC ....... *G06K 9/00791* (2013.01); *G05D 1/0088* (2013.01); *G05D 1/0214* (2013.01);
(Continued)

(58) Field of Classification Search
CPC ........... G06K 9/00791; G06K 9/00805; G06K 9/4628; G06K 9/3241; G06K 9/00798; G05D 1/0253; G05D 1/0214; G05D 1/0088; G05D 2201/0213; G05D 1/0246; G06T 7/73; G06T 2207/30252; G06T 2210/12; B60W 2420/42; G08G 1/165; G08G 1/166
(Continued)

(56) References Cited

U.S. PATENT DOCUMENTS 10,406,981 B2 * 9/2019 Chundrlik, Jr. ..... G06K 9/00798
2010/0121577 A1 * 5/2010 Zhang ................... G01S 17/931
701/301
(Continued)

OTHER PUBLICATIONS

Bojarski, M., et al., End to End Learning for Self-Driving Cars, Apr. 25, 2016, pp. 1-9.
(Continued)

*Primary Examiner* — Mahendra R Patel
(74) *Attorney, Agent, or Firm* — Rankin, Hill & Clark LLP

(57) ABSTRACT

A system and method for providing context aware road user importance estimation that include receiving at least one image of a vicinity of an ego vehicle. The system and method also include analyzing the at least one image to determine a local context associated with at least one road user located within the vicinity of the ego vehicle. The system and method additionally include determining a global context associated with the ego vehicle. The system and method further include fusing the local context and the global context to classify at least one highly important road user that is to be accounted for with respect to operating the ego vehicle.

20 Claims, 7 Drawing Sheets

(51) Int. Cl.
  *G06T 7/73* (2017.01)
  *G05D 1/00* (2006.01)
(52) U.S. Cl.
  CPC ............. *G05D 1/0253* (2013.01); *G06T 7/73* (2017.01); *G06T 2207/30252* (2013.01); *G06T 2210/12* (2013.01)
(58) Field of Classification Search
  USPC ........................................................ 382/154
  See application file for complete search history.

(56) References Cited

U.S. PATENT DOCUMENTS

| | | | | |
|---|---|---|---|---|
| 2014/0075004 | A1* | 3/2014 | Van Dusen | G06F 16/90335 709/223 |
| 2014/0236482 | A1* | 8/2014 | Dorum | G01C 21/34 701/533 |
| 2017/0010109 | A1* | 1/2017 | Hayon | G08G 1/096805 |
| 2017/0193338 | A1* | 7/2017 | Huberman | G06K 9/6281 |
| 2018/0188045 | A1* | 7/2018 | Wheeler | G05D 1/0274 |
| 2019/0049987 | A1* | 2/2019 | Djuric | G06K 9/6288 |
| 2019/0176818 | A1* | 6/2019 | Movert | G06N 3/04 |
| 2019/0228236 | A1* | 7/2019 | Licht | H04L 67/2823 |

OTHER PUBLICATIONS

Chen, X., et al., Multi-View 3D Object Detection Network for Autonomous Driving, Jun. 22, 2017, pp. 1-9.
Cornia, M., et al., Predicting Human Eye Fixations via an LSTM-based Saliency Attentive Model, IEEE CVPR, Jul. 9, 2018, vol. 1, pp. 1-13.
Halterman, R., et al., Velodyne HDL-64E LIDAR for Unmanned Surface Vehicle Obstacle Detection, SPIE Proc. 7692: Unmanned Systems Technology XII, Apr. 5-9, 2010, pp. 1-8, Orlando, FL.
Ioffe, S., et al., Batch Normalization: Accelerating Deep Network Training by Reducing Internal Covariate Shift, Mar. 2, 2015, pp. 1-11.
Janai, J, et al., Computer Vision for Autonomous Vehicles: Problems, Datasets and State-of-the-Art, ISPRS Journal of Photogrammetry and Remote Sensing, Apr. 20, 2017, pp. 1-67.
Kingma, D.P., et al., Adam: A Method for Stochastic Optimization, ICLR 2015, pp. 1-15.
Kuen, J., et al., Recurrent Attentional Networks for Saliency Detection, Apr. 12, 2016, pp. 1-10.
Li, X., et al., DeepSaliency: Multi-Task Deep Neural Network Model for Salient Object Detection, IEEE Transactions on Image Processing, Jun. 7, 2016, pp. 1-12; vol. XX, No. X.
Lin, T.-Y., et al., Microsoft COCO: Common Objects in Context, Feb. 21, 2015, pp. 1-15.
Nair, V., et al., Rectified Linear Units Improve Restricted Boltzmann Machines, Proceedings of the 27th International Conference on Machine Learnings, 2010, pp. 1-8, Haifa, Israel.
Palazzi, A., et al., Predicting the Driver's Focus of Attention: the DR(eye)VE Project, Jun. 6, 2018, pp. 1-25.
Park, S. J., et al., A Novel Signal Processing Technique for Vehicle Detection Radar, IEEE MTT-S Digest, 2003 pp. 607-610.
Pugeault, N., et al., How Much of Driving is Preattentive, IEEE Transactions on Vehicular Technology, Dec. 2015, pp. 1-15.
Rahimpour, A., et al., Person Re-Identification using Visual Attention, 2017 IEEE International Conference on Image Processing (ICIP 2017), pp. 4242-4246.
Ren, S., et al., Faster R-CNN: Towards Real-Time Object Detection with Region Proposal Networks, Jan. 6, 2016, pp. 1-14.
Sheu, S.-T., et al., DDAS: Distance and Direction Awareness System for Intelligent Vehicles, Journal of Information Science and Engineering 23, Mar. 10, 2007, pp. 709-722.
Szegedy, S., et al., Inception-v4, Inception-ResNet and the Impact of Residual Connections on Learning; Proceedings of the Thirty-First AAAI Conference on Artificial Intelligence (AAAI-17), 2017, pp. 4278-4284.
Tawari, A., et al., Learning to Attend to Salient Targets in Driving Videos Using Fully Convolutional RNN, 21st International Conference on Intelligent Transportation Systems (ITSC), Nov. 2018, pp. 3225-3232.
Underwood, G., et al., Decisions about objects in real-world scenes are influenced by visual saliency before and during their inspection, Vision Research 51, 2011, pp. 2031-2038.

* cited by examiner

SYSTEM AND METHOD FOR PROVIDING CONTEXT AWARE ROAD-USER IMPORTANCE ESTIMATION

CROSS-REFERENCE TO RELATED APPLICATION

This application claims priority to U.S. Provisional Application Ser. No. 62/801,321 filed on Feb. 5, 2019, which is expressly incorporated herein by reference.

BACKGROUND

In real world driving scenarios there can be many road users in the vicinity of an ego vehicle. Some road users may directly affect the ego vehicle's driving behavior, some may become a potential risk to the ego vehicle, and others may not pose a risk to the ego vehicle at all. The ability to discern how important or relevant any given road user is to an ego vehicle's decision is vital for building trust with human drivers, passengers, driver assistance systems, and autonomous driving systems.

BRIEF DESCRIPTION

According to one aspect, a computer-implemented method for providing context aware road user importance estimation that includes receiving at least one image of a vicinity of an ego vehicle. The computer-implemented method also includes analyzing the at least one image to determine a local context associated with at least one road user located within the vicinity of the ego vehicle. At least one road user located within the vicinity of the ego vehicle, wherein at least one potentially important road user is selected with respect to the ego vehicle. The computer-implemented method additionally includes determining a global context associated with the ego vehicle. The global context includes a predicted future path of the ego vehicle. The computer-implemented method further includes fusing the local context and the global context to classify at least one highly important road user that is to be accounted for with respect to operating the ego vehicle.

According to another aspect, a system for providing context aware road user importance estimation that includes a memory storing instructions when executed by a processor cause the processor to receive at least one image of a vicinity of an ego vehicle. The instructions also cause the processor to analyze the at least one image to determine a local context associated with at least one road user located within the vicinity of the ego vehicle. At least one potentially important road user is selected with respect to the ego vehicle. The instructions additionally cause the processor to determine a global context associated with the ego vehicle. The global context includes a predicted future path of the ego vehicle. The instructions further cause the processor to fuse the local context and the global context to classify at least one highly important road user that is to be accounted for with respect to operating the ego vehicle.

According to still another aspect, a non-transitory computer readable storage medium storing instructions that when executed by a computer, which includes a processor perform a method, the method includes receiving at least one image of a vicinity of an ego vehicle. The method also includes analyzing the at least one image to determine a local context associated with at least one road user located within the vicinity of the ego vehicle. At least one road user located within the vicinity of the ego vehicle, wherein at least one potentially important road user is selected with respect to the ego vehicle. The method additionally includes determining a global context associated with the ego vehicle. The global context includes a predicted future path of the ego vehicle. The method further includes fusing the local context and the global context to classify at least one highly important road user that is to be accounted for with respect to operating the ego vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
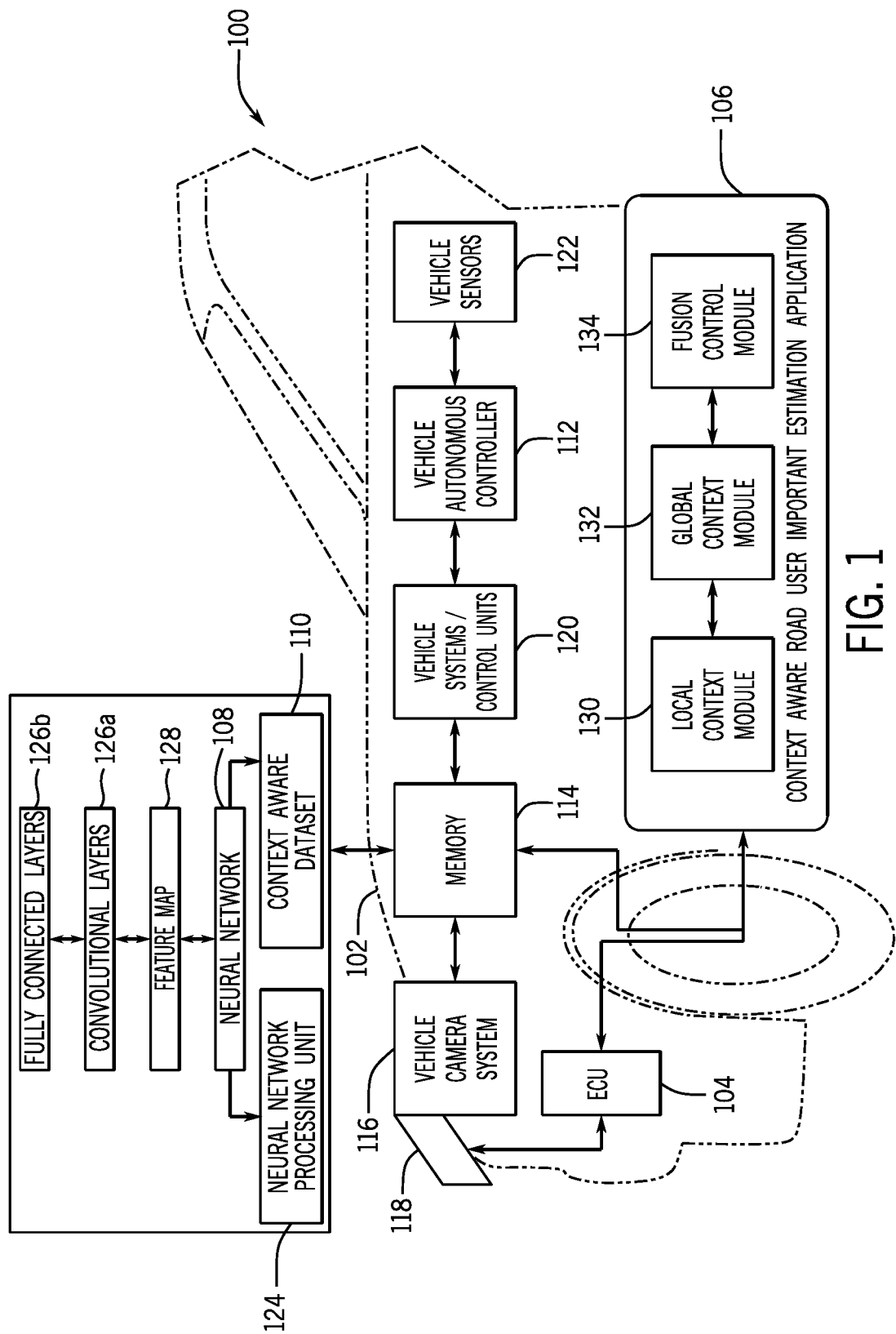
FIG. 1 is a schematic view of an exemplary operating environment for implementing systems and methods for providing context aware road user importance estimation according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing context aware road user importance estimation according to an exemplary embodiment of the present disclosure. The components of the environment 100, as well as the components of other systems, hardware architectures, and software architectures discussed herein, may be combined, omitted, or organized into different architectures for various embodiments.

Generally, the environment includes an ego vehicle 102 with an electronic control unit (ECU) 104 that executes one or more applications, operating systems, vehicle system and subsystem user interfaces, among others. The ECU 104 may also execute a context aware road user importance estimation application (context aware application) 106 that may be configured to context aware road user importance estimation with respect to one or more road users (shown in FIG. 2) that are located within a vicinity of the ego vehicle 102.

The vicinity of the ego vehicle 102 may be defined as a predetermined area located around (front/sides/behind) the ego vehicle 102 (e.g., road environment in front, sides, and/or behind of the ego vehicle 102) that may include one or more travel paths of the ego vehicle 102. The one or more road users may include, but may not be limited to, other vehicles, pedestrians, bikers, and the like that may be located within the vicinity of the ego vehicle 102 at one or more points in time.

As discussed below, the context aware application 106 may be configured to determine a local context associated with one or more of the road users that may be located within the vicinity of the ego vehicle 102. The application 106 may be configured to select one or more potentially important road users from the one or more road users located within the vicinity of the ego vehicle 102. Additionally, the context aware application 106 may be configured to compute a local appearance feature and a location feature associated with the one or more potentially important road users. The context aware application 106 may also be configured to determine a global context that includes global features of the predicted intention (future path) of the ego vehicle 102. The predicted intention may be represented as values that pertain to a predicted future path of the ego vehicle 102.

As also discussed in more detail below, the context aware application 106 may be configured to fuse the local context and the global context to estimate an important level associated with one or more road users that are located within the vicinity of the ego vehicle 102 to enable the ego vehicle 102 to account for the presence of one or more road users that are thereby classified as highly important road users by the application 106.

The highly important road users may be classified as such based on a potential of overlap between a predicted intended path of the ego vehicle 102 in one or more future points in time and locations, positions, and/or trajectories of the one or more road users classified as highly important road users. Accordingly, the context aware application 106 may implement a multi-stage local and global context model that evaluates road users located within the vicinity of the ego vehicle 102 as captured within one or more images of the vicinity of the ego vehicle 102 and a predicted future path of the ego vehicle 102.

Figure 2:
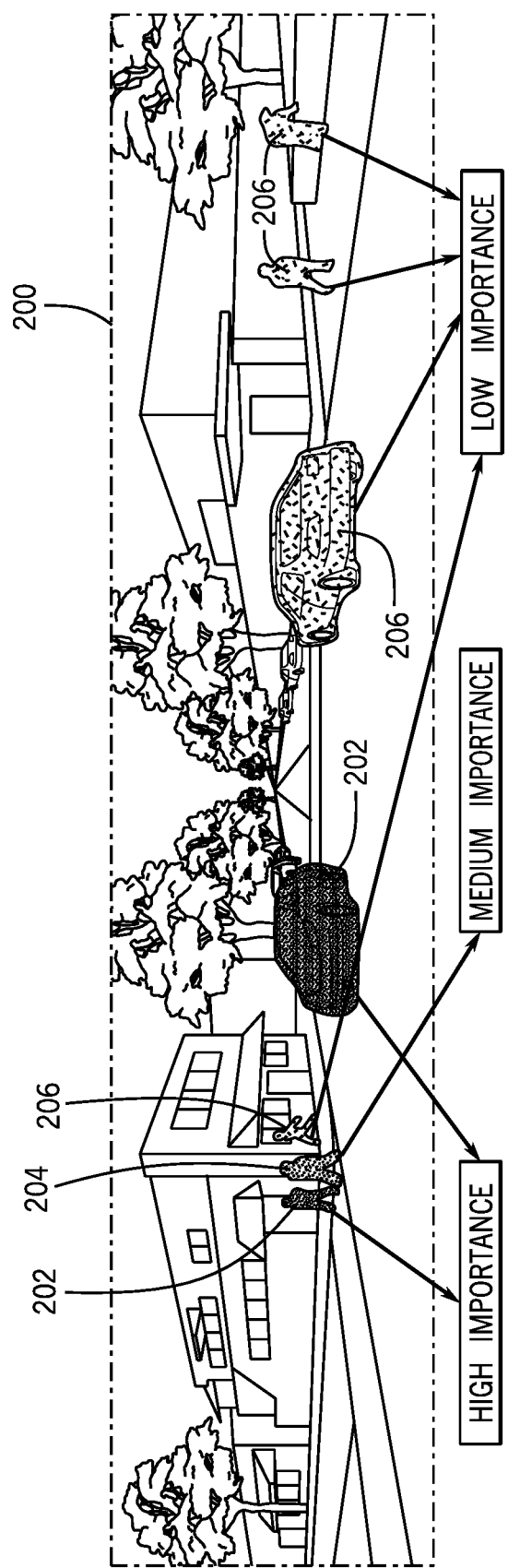
FIG. 2 is an illustrative example of the road user important estimation provided by the context aware application according to an exemplary embodiment of the present disclosure.

With reference to FIG. 1 and to FIG. 2, an illustrative example of the road user important estimation provided by the context aware application 106 according to an exemplary embodiment of the present disclosure, the context aware application 106 may be configured to analyze images of the vicinity 200 of the ego vehicle 102 and utilize a neural network 108 to determine the local context that is represented by a selection of one or more of the road users 202-206 as potentially important road users. The application 106 may select the one or more road users 202-206 as potentially important road users that may be located on one or more potential paths of the ego vehicle 102 and/or that may travel onto one or more potential paths of the ego vehicle 102.

The context aware application 106 may also be configured to utilize the global context as a representation that is output by the neural network 108 to predict a future path of the ego vehicle 102. Based on the predicted future path of the ego vehicle 102 and the determination of one or more potentially important road users, the context aware application 106 may fuse the local context and global context to output an estimated importance of one or more road users located within the vicinity of the ego vehicle 102.

With continued reference to FIG. 1 and FIG. 2, upon selecting the one or more potentially important road users during determination of the local context and upon predicting the estimated future path of the ego vehicle 102 during determination of the global context, the application 106 may additionally be configured to fuse the local context and the global context. In some configurations, the application 106 may evaluate locations, positions, and/or trajectories of one or more potentially important road users that may be located within the vicinity 200 of the ego vehicle 102 to determine one or more road users 202-210 whose paths of travel may potentially overlap with the estimated future path of the ego vehicle 102.

As shown, in the illustrative example of FIG. 2, if the ego vehicle 102 is located at a traffic intersection and its estimated path of travel includes a left turn maneuver from the intersection, the road users 202 may be classified as highly important road users that are to be taken into account during operation of the ego vehicle 102 since their paths of travel may potentially overlap with the estimated future path of the ego vehicle 102. Stated differently, the application 106 may ensure that the locations, positions, and/or trajectories of one or more highly important road users are taken into account when making one or more decision points associated with safe navigation of the ego vehicle 102 to operate the ego vehicle 102 to take the left turn maneuver through the intersection in a safe manner. In some configurations, the application 106 may additionally classify one or more potentially important road users, as medium importance road users 204 and low importance road users 206, based on the medium likelihood or low likelihood that their respective paths of travel may potentially overlap with the estimated future path of the ego vehicle 102.

In an exemplary embodiment, the application 106 may communicate with a vehicle autonomous controller 112 of the ego vehicle 102 to execute one or more commands to operably control the ego vehicle 102 to be fully autonomously driven or semi-autonomously driven in a particular manner that accounts for the highly important road users 202 and/or one or more external factors that may include, but may not be limited to, a lane in which the ego vehicle 102 is traveling, status of traffic signals, traffic patterns, traffic regulations, etc. In additional embodiments, the application 106 may provide warnings to a driver of the ego vehicle 102 through one or more vehicle systems/control units 120 to warn/alert the driver to account for the highly important road users 202, the medium importance road users 204 and/or the low importance road users 206.

In one embodiment, the application 106 may also be configured to communicate with the neural network 108 to build and maintain a context aware dataset 110 that may be collected for one or more roadway environmental scenarios that may include scenarios that pertain to the similar surrounding vicinities of the ego vehicle 102 (similar to the vicinity of the ego vehicle 102 at which one or more road users are classified as one or more highly important road users) that the ego vehicle 102 may subsequently travel to at one or more points in time. The application 106 may access and analyze the context aware dataset 110 to provide motion planning capabilities while executing autonomous driving commands to the vehicle autonomous controller 112 that may be provided to autonomously control the ego vehicle 102 to preemptively adapt to the positon, location, and traveling direction of one or more road users within a vicinity of the ego vehicle 102.

With continued reference to FIG. 1, in addition to the ECU 104, the vehicle autonomous controller 112, and the vehicle systems/control units 120, the vehicle may include a plurality of components, for example, a memory 114, a vehicle camera system 116 that is operably connected to one or more cameras 118, and vehicle sensors 122. In an exemplary embodiment, the ECU 104 may be configured to operably control the plurality of components of the ego vehicle 102.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102. The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the memory 114 to execute the one or more applications, operating systems, vehicle system and subsystem user interfaces, and the like that are stored within the memory 114.

In one embodiment, the ECU 104 may communicate with the vehicle autonomous controller 112 to execute autonomous driving commands to operate the ego vehicle 102 to be fully autonomously driven or semi-autonomously driven in a particular manner that accounts for the highly important road users 202 and/or one or more external factors that may include, but may not be limited to, a lane in which the ego vehicle 102 is traveling, status of traffic signals, traffic patterns, traffic regulations, etc. In some embodiments, the ECU 104 may communicate with the vehicle autonomous controller 112 to execute an autonomous driving plan based on an evaluation of the context aware dataset 110 and the location, positions, and/or traveling directions of one or more road users that are determined to be located within the vicinity of the ego vehicle 102.

In one embodiment, the vehicle autonomous controller 112 may additionally provide one or more commands to one or more of the vehicle systems/control units 120 of the ego vehicle 102, including, but not limited to an engine control unit, a braking control unit, a transmission control unit, a steering control unit, and the like to control the ego vehicle 102 to be autonomously driven based on data communicated by the application 106 to autonomously or semi-autonomously control the ego vehicle 102 upon classifying one or more highly important road users and/or based on the autonomous driving plan. In other words, the ego vehicle 102 may be autonomously driven to adapt to locations, positons, and/or trajectories of one or more highly important road users and/or based on one or more factors that may influence the autonomous driving plan (e.g., lane in which the ego vehicle 102 is traveling, status of traffic signals, traffic patterns, traffic regulations, etc.).

In particular, the vehicle autonomous controller 112 may be configured to provide one or more commands (signals) to one or more of the vehicle systems and control units 120 to provide full autonomous or semi-autonomous control of the ego vehicle 102. Such autonomous control of the ego vehicle 102 may be provided by sending one or more commands to control one or more of the vehicle systems/control units 120 to operate (e.g., drive) the ego vehicle 102 during one or more circumstances (e.g., when providing driver assist controls), and/or fully to control driving of the ego vehicle 102 during an entire trip of the ego vehicle 102.

In some configurations, the vehicle systems/control units 120 may also include Advanced Driver Assistance Systems (ADAS), for example, an adaptive cruise control system, a blind spot monitoring system, a collision mitigation system, a lane departure warning system, among others (not individually shown) that may be utilized to provide warnings/alerts to the driver of the ego vehicle 102 (e.g., if the ego vehicle 102 is being driven by a driver and not autonomously) for preemptive collision avoidance purposes based on the locations, positons, and/or trajectories of one or more road users within the vicinity of the ego vehicle 102.

In one embodiment, the vehicle systems/control units 120 may be operably connected to vehicle sensors 122 of the ego vehicle 102. The vehicle sensors 122 may include, but are not limited to, sensors associated with the vehicle systems/control units 120 and other sensors associated with one or more electronic components and/or mechanical components (not shown) of the ego vehicle 102. Specific vehicle sensors 122 may include, but are not limited to, vehicle steering angle sensors, vehicle speed sensors, vehicle acceleration sensors, vehicle angular velocity sensors, accelerator pedal sensors, vehicle brake sensors, vehicle locational sensors (e.g., GPS), vehicle directional sensors (e.g., vehicle compass), throttle position sensors, wheel sensors, anti-lock brake sensors, camshaft sensors, among others. As discussed in more detail below, one or more of the vehicle sensors 122 may provide sensor data to the context aware application 106. The sensor data may be analyzed by the application 106 during the determination of the global context to output the predicted future path of the ego vehicle 102.

In one configuration, the memory 114 of the ego vehicle 102 may be configured to store one or more executable files associated with one or more operating systems, applications, associated operating system data, application data, vehicle system and subsystem user interface data, and the like that are executed by the ECU 104. In one or more embodiments, the memory 114 of the ego vehicle 102 may be accessed by the context aware application 106 to store data, for example, one or more images of the vicinity of the ego vehicle 102. In some embodiments, the memory 114 may include one or more road user models (not shown) that may be associated with one or more types of road users. The one or more road user models may represent values that include a range of sizes and features (based on image data) that are associated to respective types of road users (e.g., automobiles, pedestrians, bicyclists, etc.) In some configurations, the application 106 may analyze the road user models to further classify a type of road user to thereby determine a future path of one or more road users based on a future expected speed, trajectory, location and/or positon of one or more road users as determined based on the road user models.

In an exemplary embodiment, the memory 114 may include components of the neural network 108. The neural network 108 may be configured as a convolutional neural network (CNN) that includes a plurality of convolutional layers 126a and fully connected layers 126b. The neural network 108 may utilize machine learning/deep learning to provide artificial intelligence capabilities that may be utilized to encode and compute bounding boxes around one or more road users located within the vicinity of the ego vehicle 102 based on images of the vicinity of the ego vehicle 102 as provided by the vehicle camera system 116. As discussed below, the neural network 108 may utilize pre-trained data to annotate the computed bounding boxes.

In one or more embodiments, the neural network 108 may include a neural network processing unit 124 that may provide processing capabilities to be configured to utilize machine learning/deep learning to provide artificial intelligence capabilities that may be utilized to output data to the context aware application 106 and to build and maintain the context aware dataset 110. The neural network processing unit 124 may process information that is provided as inputs and may access one or more stored datasets to provide various functions, that may include, but may not be limited to, object classification, feature recognition, computer vision, speed recognition, machine translation, path prediction, autonomous driving commands, and the like.

In one embodiment, the neural network 108 may be configured as a road user generation model. In one example, the neural network 108 may be trained with an important road user generator model that are initialized with Faster R-CNN objection detection algorithms trained on an object detection dataset and then trained on important road user annotations. Accordingly, the neural network 108 may be utilized to select one or more potentially important road users based on ground truth annotations from the important road user annotations and object detection dataset and may thereby compute a local appearance feature and a location feature for each potentially important road user proposal. In one configuration, the important road user proposal generation is performed by the neural network 108 by executing a Region Proposal Network (RPN) which predicts object proposals and at each spatial location. Accordingly, the neural network 108 is configured to predict a class-agnostic objectiveness score and a bounding box refinement for anchor boxes of multiple scales and aspect ratios.

The neural network 108 may additionally be configured to use non-maximum suppression with an intersection-over-union (IoU) threshold with respect to each bounding box to select top box proposals that are associated with one or more road users that are classified as one or more potentially important road users. In some configurations, the neural network 108 may utilize region of interest (RoI) pooling to extract a (fixed-sized) feature map 128 for each bounding box associated with each potentially important road user.

The feature map 128 may go through one or more convolutional layers 126a and/or one or more fully connected layers 126b of the neural network 108, where a class label that classifies one or more of the potentially important road users as highly important road users is annotated to one or more respective bounding boxes associated with the one or more highly important road users. The neural network 108 may make one or more bounding box refinements to the bounding boxes associated with one or more highly important road users to thereby analyze the locations, positions, and/or trajectories of the one or more highly important road users with respect to the estimated path of travel of the ego vehicle 102. As discussed, this analysis takes into account the one or more highly important road users for decision making with respect to operating the ego vehicle 102. For example, the ego vehicle 102 may be operably controlled to be fully autonomously driven or semi-autonomously driven in a particular manner that accounts for the highly important road users 202 and/or one or more external factors that may include, but may not be limited to, a lane in which the ego vehicle 102 is traveling, status of traffic signals, traffic patterns, traffic regulations, etc.

With continued reference to FIG. 1, the vehicle camera system 116 may include one or more cameras 118 that are positioned in one or more directions and at one or more areas to capture one or more images of the (surrounding) vicinity of the ego vehicle 102. The one or more cameras 118 of the vehicle camera system 116 may be disposed at external front portions of the ego vehicle 102, including, but not limited to different portions of the vehicle dashboard, vehicle bumper, vehicle front lighting units, vehicle fenders, and the windshield. In one embodiment, the one or more cameras 118 may be configured as RGB cameras that may capture RGB bands that are configured to capture rich information about object appearance, as well as relationships and interactions between the ego vehicle 102 and objects within the vicinity of the ego vehicle 102 which may include one or more road users that are located within the vicinity of the ego vehicle 102.

In other embodiments, the one or more cameras 118 may be configured as stereoscopic cameras that are configured to capture environmental information in the form three-dimensional images. In one or more configurations, the one or more cameras 118 may be configured to capture one or more first person viewpoint images (e.g., images, videos) of the vicinity of the ego vehicle 102. The vehicle camera system 116 may be configured to convert the one or more images into image data that is communicated to the context aware application 106 to be analyzed.

As discussed, the image data that may be provided by the vehicle camera system 116 to the context aware application 106 may be further evaluated and processed based on the utilization of the neural network 108. In some embodiments, the application 106 may be configured to execute image logic to perform feature extraction and determination to determine one or more road users that are located within the vicinity of the ego vehicle 102 based on the image(s). In one embodiment, the image logic may also be utilized to determine one or more sets of image coordinates associated with one or more objects that may include, but may not be limited to, one or more road users (e.g., pedestrians, bikers, other vehicles), roadway attributes (e.g., lane markings, off-ramps, curbs), and road side objects (e.g., traffic light, stop sign) that are located within the vicinity of the ego vehicle 102. Such image coordinates may be utilized by the application 106 to initially compute bounding boxes around one or more objects including one or more road users that may be located within the vicinity of the ego vehicle 102.

II. The Context Aware Road User Important Estimation Application and Related Methods Components of the context aware application 106 will now be described according to an exemplary embodiment and with reference to FIG. 1. In an exemplary embodiment, the context aware application 106 may be stored on the memory 114 and executed by the ECU 104 of the ego vehicle 102. In another embodiment, the context aware application 106 may be stored on an externally hosted computing infrastructure (not shown) and may be accessed by a communication device (not shown) of the ego vehicle 102 to be executed by the ECU 104 of the ego vehicle 102.

The general functionality of context aware application 106 will now be discussed. In an exemplary embodiment, the context aware application 106 may include a local context module 130, a global context module 132, and a fusion control module 134. However, it is appreciated that the context aware application 106 may include one or more additional modules and/or sub-modules that are included in lieu of the modules 130-134.

As discussed in more detail below, the local context module 130 may be configured to analyze image data communicated by the vehicle camera system 116 to determine a local context associated with one or more road users located within the vicinity of the ego vehicle 102. As discussed in more detail below, the local context module 130 may utilize the neural network 108 to classify one or more road users located within the vicinity of the ego vehicle 102 as potentially important road users based on the appearance of the one or more road users with respect to the location of the ego vehicle 102. This classification may be based on the road users that may be located on one or more potential paths of the ego vehicle 102 and/or that may travel onto one or more potential paths of the ego vehicle 102.

The local context module 130 may additionally be configured to compute the local appearance feature of one or more road users that includes information about orientation, dynamics, intention, distance, etc. associated with one or more of the road users selected as one or more potentially important road users. Additionally, the local context module 130 may be configured to compute a location feature of one or more road users that accounts for different sizes and distances of the one or more one or more of the road users selected as one or more potentially important road users with respect to the ego vehicle 102.

Also discussed below, the global context module 132 may be configured to analyze sensor data provided by the vehicle sensors 122 to construct a future path vector of the ego vehicle 102. The global context module 132 may utilize the convolutional layers 126*a* and/or fully connected layers 126*b* of the neural network 108 and may utilize a flatten feature of the feature map 128 of a last convolutional layer of the fully connected layers 126*b* to provide an intention-based context feature and estimate a predicted future path of the ego vehicle 102 at one or more future time steps (e.g. 0.25 second time steps).

In one or more configurations, the fusion control module 134 may be configured to perform feature fusion. In particular, the fusion control module 134 may be configured to concatenate local features of the local context and global features of the global context to estimate the importance associated with each of the one or more potentially important road users with respect to the predicted future path of the ego vehicle 102. In particular, the fusion control module 134 may be configured to evaluate positions, locations, and/or trajectories of one or more potentially important road users that may be located within the vicinity of the ego vehicle 102 to determine one or more road users whose paths of travel may potentially overlap with the estimated future path of the ego vehicle 102 and may classify those respective road users as highly important road users.

The fusion control module 134 may additionally be configured to communicate one or more commands (e.g., data signals) to the ECU 104 and/or the vehicle autonomous controller 112 to autonomously control the ego vehicle 102 based on the positions, locations, and/or trajectories of one or more highly important road users to enable the ego vehicle 102 to be operated in a manner that accounts for the one or more highly important road users to safely navigate within the vicinity of the ego vehicle 102. In some embodiments, the fusion control module 134 may be configured to access the context aware dataset 110 to provide motion planning capabilities while executing autonomous driving commands to the vehicle autonomous controller 112 that may be provided to autonomously control the ego vehicle 102 to preemptively adapt to the positon, location, and traveling direction of one or more road users within the vicinity of the ego vehicle 102. In additional embodiments, the fusion control module 134 may communicate with the ECU 104 and/or one or more of the vehicle systems/control units 120 to provide warnings/alerts to the driver of the ego vehicle 102 (e.g., if the ego vehicle 102 is being driven by a driver and not autonomously) for preemptive collision avoidance purposes based on the locations, positons, and/or trajectories of one or more road users within the vicinity of the ego vehicle 102.

Figure 3:
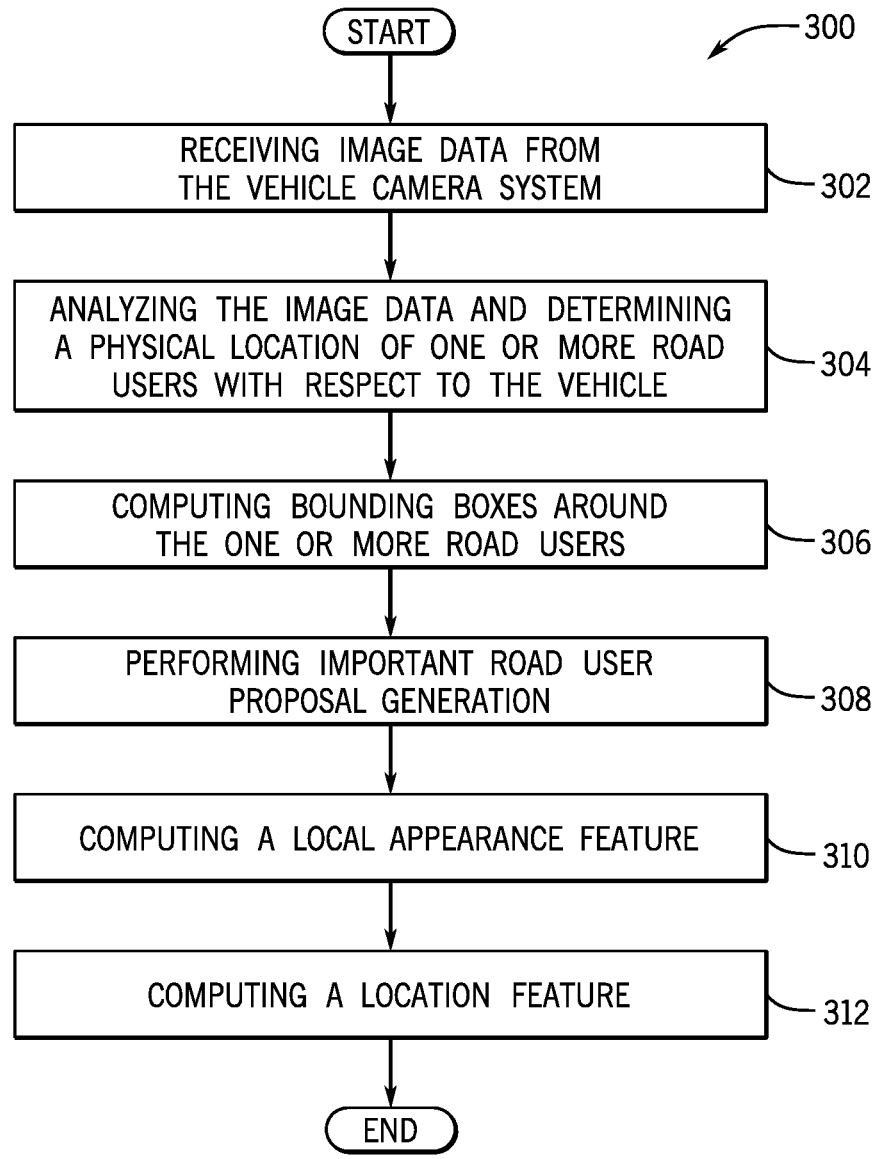
FIG. 3 is a process flow diagram of a method for determining a local context associated with at least one road user located within the vicinity of the ego vehicle according to an exemplary embodiment of the present disclosure.

FIG. 3 is a process flow diagram of a method 300 for determining a local context associated with at least one road user located within the vicinity of the ego vehicle 102 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving image data from the vehicle camera system 116.

In an exemplary embodiment, the local context module 130 of the context aware application 106 may be configured to communicate with the vehicle camera system 116 to receive image data. As discussed above, the image data may pertain to one or more images of the vicinity of the ego vehicle 102 that are captured by one or more cameras 118 that are operably connected to the vehicle camera system 116. In some embodiments, the local context module 130 may package and store the image data on the memory 114 to be evaluated at one or more points in time.

The method 300 may proceed to block 304, wherein the method 300 may include analyzing the image data and determining a physical location of one or more road users with respect to the ego vehicle 102. In one embodiment, the local context module 130 may execute image logic to evaluate the image data. In particular, the image logic may be utilized to perform feature extraction and feature determination to determine one or more road users that are located within the vicinity of the ego vehicle 102 and the physical locations of the one or more road users with respect to the ego vehicle 102 based on the image(s). In some configurations, the image logic may include the one or more road user models that represent values that include a range of sizes and features that are associated to respective types of road users (e.g., automobiles, pedestrians, bicyclists, etc.) to identify the one or more road users.

The method 300 may proceed to block 306, wherein the method 300 may include computing bounding boxes around the one or more road users. In one embodiment, upon determining the one or more road users and the physical location of the one or more road users with respect to the ego vehicle 102, the local context module 130 may execute the image logic to determine one or more sets of image coordinates that are associated with one or more objects that may include, but may not be limited to, one or more road users (e.g., pedestrians, bikers, other vehicles), roadway attributes (e.g., lane markings, off-ramps, curbs), and road side objects (e.g., traffic light, stop sign) that are located within the vicinity of the ego vehicle 102. Such image coordinates may be utilized by the local context module 130 to compute bounding boxes around one or more objects including one or more road users that may be located within the vicinity of the ego vehicle 102.

The method 300 may proceed to block 308, wherein the method 300 may include performing important road user proposal generation. In an exemplary embodiment, the local context module 130 may utilize the neural network 108 to perform important road user proposal generation. In particular, the neural network processing unit 124 of the neural network 108 may be configured to exploit Faster R-CNN to select one or more potentially important road users based on the ground truth annotations that are stored within the object detection dataset. In one embodiment, the neural network 108 may utilize the RPN to predict object proposals at each spatial location of the vicinity of the ego vehicle 102. The neural network 108 may thereby predict a class-agnostic objectness score and may perform bounding box refinement of one or more bounding boxes that are associated with one or more road users. The bounding box refinement may be completed for bounding boxes of multiple scales and aspect ratios.

In one embodiment, the neural network 108 may be configured to utilize RoI poling to extract the feature map(s) 128 for each of the one or more bounding boxes. The feature map(s) 128 may be inputted through the convolutional layers 126*a* where a class label (e.g., potentially important road user) and bounding box refinements for each bounding box are obtained. Accordingly, one or more bounding boxes may be refined and annotated with the class labels that are associated with one or more road users that are selected as potentially important road users that may be located on one or more potential paths of the ego vehicle 102 and/or that may travel onto one or more potential paths of the ego vehicle 102.

The method 300 may proceed to block 310 wherein the method 300 may include computing a local appearance feature. In an exemplary embodiment, the local context module 130 may generate an appearance feature for each potential important road user proposal. In one configuration, the neural network 108 may analyze a pre-trained model (e.g., Inception-ResNet-V2 model) as a feature extractor in conjunction with the road user proposal generator model. The neural network 108 may be configured to take a final output of the model with respect to the one or more potentially important road users and may select all bounding boxes associated with the one or more potentially important road users where the probability of belonging to an "important" class exceeds a confidence threshold.

For each selected proposal, the appearance feature is defined as an output of the RoI pooling layer for that bounding box. The appearance feature of the one or more potentially important road users may contain rich information about orientation of the one of the more potentially important road users with respect to the ego vehicle 102. Additionally, the appearance feature of the of the one or more potentially important road users may contain rich information about dynamics associated with the potentially important road user(s), intention(s) associated with the potentially important road user(s), distance(s) of the potentially important road user(s) with respect to the ego vehicle 102.

The method 300 may proceed to block 312, wherein the method 300 may include computing a location feature. In an exemplary embodiment, the local context module 130 takes into account that one or more road users with different sizes and distances to the ego vehicle 102 may have different attributes which may make some more distinguishable than others. Accordingly, the local context module 130 may consider a 4D vector as a local feature for each of the one or more potentially important road users that are selected and located within the vicinity of the ego vehicle 102.

In one embodiment, for each proposal pertaining to one or more potentially important road users, the location feature $f_{loc}$ may be defined as:

$$f_{loc}=[(x_{max}+x_{min})/2, y_{max}), h, w]$$

Here, $((x_{max}+x_{min})/2, y_{max})$ is the coordinate of a middle bottom point of each bounding box that is associated with the one or more potentially important road users and h and w are the height and width of each bounding box. Accordingly, by computing the location feature, the local context module 130 may determine a correlation between proximity, mass, and importance with respect to each potentially important road user and the ego vehicle 102.

Figure 6:
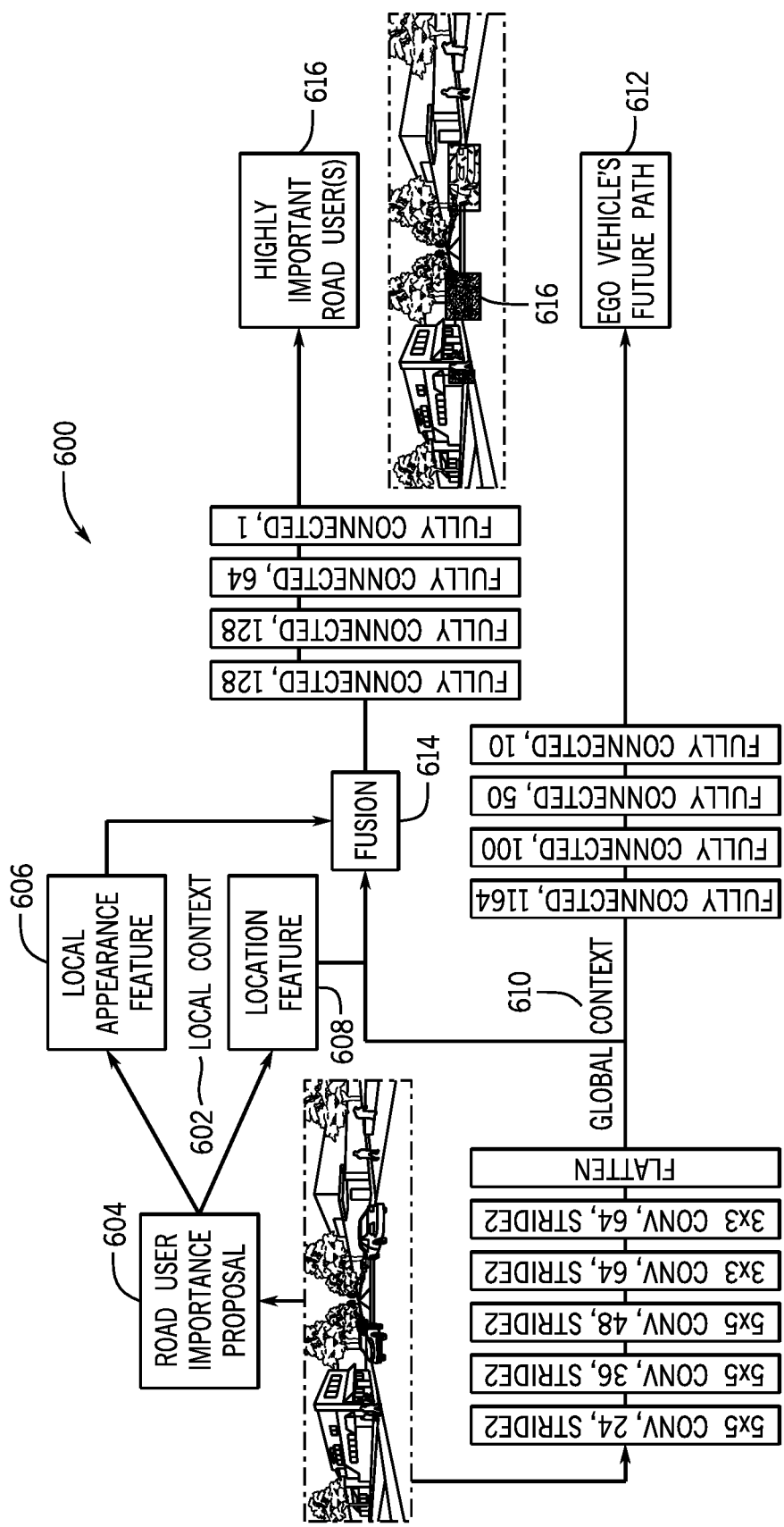
FIG. 6 is a block diagram of a model utilized by a context aware application according to an exemplary embodiment of the present disclosure.

Referring to FIG. 6, a block diagram of a model 600 utilized by the context aware application 106 according to an exemplary embodiment of the present disclosure, the local context 602 may be determined by the local context module 130. As shown, the local context 602 may include the selection of the road user importance proposal 604 by the local context module 130 to select one or more potentially important road users that are located within the vicinity of the ego vehicle 102. Additionally, the local context module 130 may compute the local appearance feature 606 and the location feature 608 of the one or more potentially important road users as selected based on the road user importance proposal 604.

Figure 4:
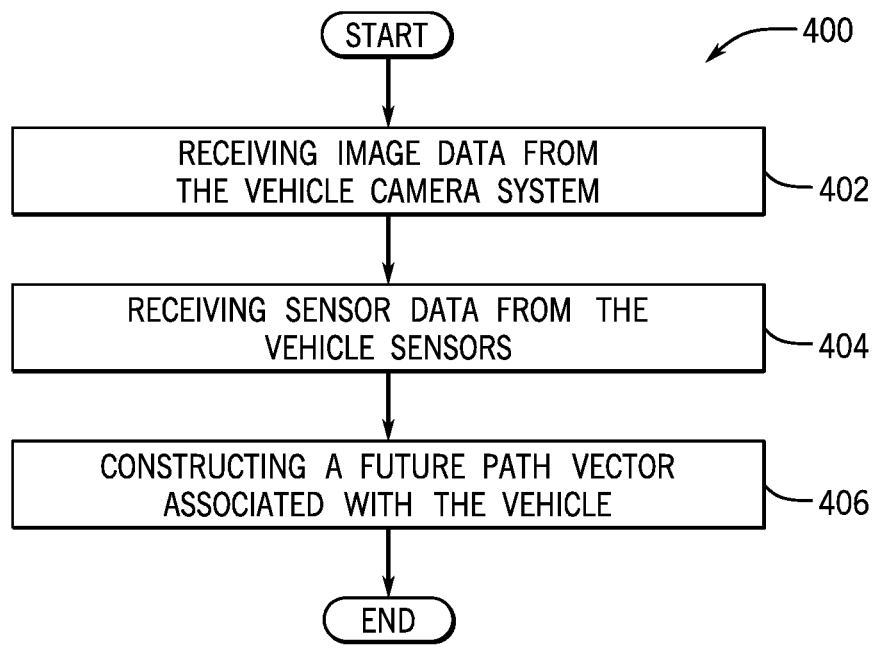
FIG. 4 is a process flow diagram of a method for determining a global context associated with the ego vehicle to predict a future path of the ego vehicle according to an exemplary embodiment of the present disclosure.

FIG. 4 is a process flow diagram of a method 400 for determining a global context associated with the ego vehicle 102 to predict a future path of the ego vehicle 102 according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include receiving image data from the vehicle camera system 116.

In an exemplary embodiment, the global context module 132 of the context aware application 106 may be configured to communicate with the vehicle camera system 116 to receive image data. As discussed above, the image data may pertain to one or more images of the vicinity of the ego vehicle 102 that are captured by one or more cameras 118 that are operably connected to the vehicle camera system 116. In some embodiments, the global context module 132 may package and store the image data on the memory 114 to be evaluated at one or more points in time.

Upon receiving the image data, the global context module 132 may execute image logic to determine an environment of the ego vehicle 102. In particular, the global context module 132 may determine one or more objects, roads, lanes, traffic lights, traffic signals, road markings, buildings, trees, and the like that may be located within the vicinity of the ego vehicle 102. The global context module 132 may additionally determine one or more driving scenarios that the ego vehicle 102 is currently being operated in. Such driving scenarios may include, but may not be limited to, an intersection scenario, a left turn scenario, a right turn scenario, a straight driving scenario, a cruising scenario, an off-ramp scenario, an on-ramp scenario, and the like that may provide context to the operation and vicinity of the ego vehicle 102.

In some embodiments, the global context module 132 may additionally communicate with the ECU 104 to determine the operation of turn signals, head lights, windshield wipers, and/or other components of the ego vehicle 102 that may provide more context with respect to the environment of the ego vehicle 102 and one or more driving scenarios. For example, if the environment includes an intersection where the ego vehicle 102 is stopped in a left lane during an intersection scenario, the activation of a left turn signal as communicated by the ECU 104 may provide context with respect to an intention of a left turn of the ego vehicle 102 at the intersection.

Accordingly, the intention of the ego vehicle 102 may be utilized to play a role in estimating the importance of one or more road users that may be located within the vicinity of the ego vehicle 102. For example, if the vehicle's intention is to make a left turn at the intersection, then one or more road users that are located to the right of the ego vehicle 102 in one or more adjacent lanes of the intersection may be considered relatively less important than one or more road users that may be located in one or more potentially overlapping future predicted pathways of the ego vehicle 102 that may be used during the left turn.

The method 400 may proceed to block 404, wherein the method 400 may include receiving sensor data from the vehicle sensors 122. In an exemplary embodiment, the global context module 132 of the context aware application 106 may be configured to communicate with the vehicle sensors 122 to receive sensor data. In one embodiment, the vehicle steering angle sensors of the vehicle sensors 122 may be configured to communicate sensor data that pertains to one or more steering angle values that are associated with the steering angle of the ego vehicle 102. It is appreciated that additional sensors of the vehicle sensors 122 may also communicate respective sensor data that may be received by the global context module 132.

The method 400 may proceed to block 406, wherein the method 400 may include constructing a future path vector associated with the ego vehicle 102. In one configuration, the global context determined by the global context module 132 may be based on convolutional layers 126*a* followed by fully connected layers 126*b* (e.g., four fully connected layers) with batch normalization and drop out layers in between. A flatten feature of the last convolutional layer of the convolutional layers 126*a* may be used as the global context feature. For example, the last convolutional layer may be extracted and flattened to 1164D vector and used as the context feature for each image.

In an exemplary embodiment, upon receiving sensor data that pertains to one or more steering angle values that are associated with the steering angle of the ego vehicle 102, the global context module 132 may analyze the steering angle value(s) and the context feature for each image and may learn a mapping between the image(s) of the vicinity including the environment and one or more driving scenarios that the ego vehicle 102 is being operated in and an instantaneous steering angle. In particular, the global context module 132 may communicate with the neural network 108 to input image data associated with the image(s) of the vicinity of the ego vehicle 102 along with the steering angle value associated with the instantaneous steering angle. The neural network 108 may perform machine learning/deep learning to provide artificial intelligence capabilities to predict a 10D vector of the future path of the ego vehicle 102.

In an exemplary embodiment, the neural network 108 may construct the future path vector associated with the ego vehicle 102 as ten steering angle values that represent the next ten spatial steps of the ego vehicle 102 with one meter spacing. The model for predicting the future path of the ego vehicle 102 may be constructed based on the convolutional layers 126*a* and/or the fully connected layers 126*b* of the neural network 108. It is appreciated that sensor data from additional sensors of the vehicle sensors 122 may additionally or alternatively be utilized to construct the future path vector associated with the ego vehicle 102. With reference again to FIG. 6, as shown the global context 610 may be determined using four fully connected layers to predict the ego vehicle's predicted future path 612.

Figure 5:
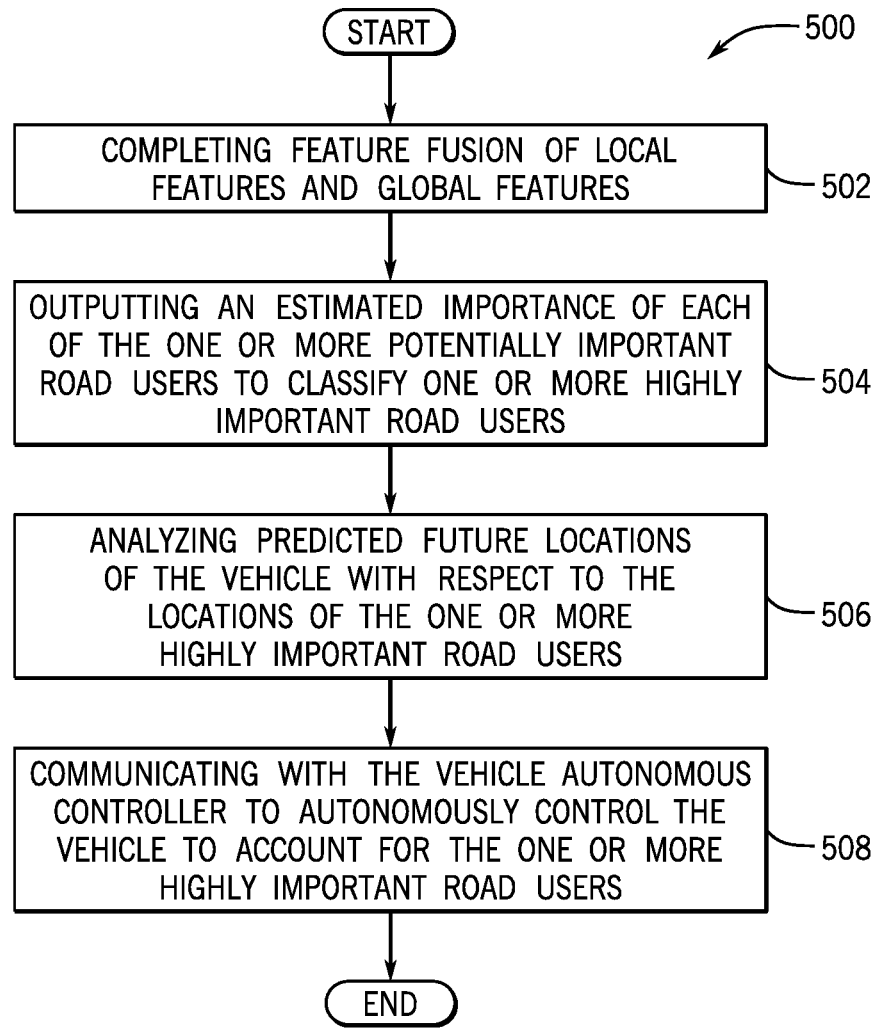
FIG. 5 is a process flow diagram of a method for completing feature fusion of outputting an estimated importance of each of the one or more potentially important road users and autonomously controlling the ego vehicle to account for one or more highly important road users according to an exemplary embodiment of the present disclosure.

FIG. 5 is a process flow diagram of a method 500 for completing feature fusion of outputting an estimated importance of each of the one or more potentially important road users and autonomously controlling the ego vehicle 102 to account for one or more highly important road users according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include completing feature fusion of local features and global features.

In an exemplary embodiment, upon determining the local context, the local context module 130 may communicate respective data associated with the selection of one or more potentially important road users that may be located within the vicinity of the ego vehicle 102 in addition to the local appearance features and location features (based on the execution of the method 300) to the fusion control module 134 of the context aware application 106. Additionally, upon determining the global context, the global context module 132 may communicate respective data associated with the intention-based global context pertaining to the predicted future path of the ego vehicle 102 (based on the execution of the method 400) to the fusion control module 134.

In one or more embodiments, the fusion control module 134 may be configured to analyze the data associated with the local context and the data associated with the global context and may thereby extract the local features (i.e., appearance and location features) and global features (i.e., intention based context) from the data. The fusion control module 134 may be configured to fuse the local context and the global context. In particular, the fusion control module 134 may be configured to concatenate the local features and the global features together.

The method 500 may proceed to block 504, wherein the method 500 may include outputting an estimated importance of each of the one or more potentially important road users to classify one or more highly important road users. In one embodiment, upon concatenating the local features extracted from the local context and the global features extracted from the global context, the fusion control module 134 may thereby utilize four fully connected layers of the convolutional layers 126 of the neural network 108 to estimate an importance of each of the one or more road users selected as one or more potentially important road users.

Accordingly, the concatenation of the local features derived from potentially important road user proposals and the future path vector associated with the ego vehicle 102 may allow the fusion control module 134 to classify one or more highly important road users of the one or more potentially important road users. The highly important road users may be classified as such based on a potential of overlap between the predicted intended path of the ego vehicle 102 in one or more future points in time and locations, positions, and/or trajectories of the one or more road users. Stated differently, the one or more road users that are classified as highly important road users are those that are estimated to be most accounted for decision making with respect to operating the ego vehicle 102. In some configurations, the fusion control module 134 may additionally classify one or more of the potentially important road users as medium importance road users and/or low importance road users, based on the medium or low likelihood that their respective paths of travel may potentially overlap with the estimated future path of the ego vehicle 102.

With reference again to FIG. 6, as shown, the fusion control module 134 may be configured to complete fusion 614 of the local context 602 and the global context 610. The fusion control module 134 may utilize the fully connected layers 126*b* of the neural network 108 to classify one or more highly important road user(s) 616 that may classified as such based on a potential of overlap between the predicted future path 612 of the ego vehicle 102 in one or more future points in time and locations, positions, and/or trajectories of the respective road user(s).

Referring again to FIG. 5, the method 500 may proceed to block 506, wherein the method 500 may include analyzing predicted future locations of the ego vehicle 102 with respect to the locations of the one or more highly important road users. In an exemplary embodiment, upon classifying one or more highly important road users, the fusion control module 134 may be configured to reconstruct bounding boxes around the one or more road users classified as the highly important road users. The fusion control module 134 may thereby analyze the location, positions, and/or trajectories of the one or more highly important road users located within the vicinity of the ego vehicle 102. The fusion control module 134 may additionally analyze the future predicted path of the ego vehicle 102 in one or more future points in time based on the global context determined by the global context module 132. The fusion control module 134 may thereby determine one or more locations and one or more potential future time points at which future predicted path of the ego vehicle 102 and the one or more highly important road users may overlap.

The method 500 may proceed to block 508, wherein the method 500 may include communicating with the vehicle autonomous controller 112 to autonomously control the ego vehicle 102 to account for the one or more highly important road users. In an exemplary embodiment, upon analyzing the predicted future locations of the ego vehicle 102 with respect to the locations of the one or more highly important road users, the fusion control module 134 may communicate one or more commands (e.g., data signals) to the vehicle autonomous controller 112 and/or the ECU 104 to autonomously control the ego vehicle 102 to account for the one or more highly important road users.

In one or more embodiments, the vehicle autonomous controller 112 may operably control one or more of the vehicle systems/control units 120 to autonomously or semi-autonomously control the ego vehicle 102 based on the location(s) of the one or more highly important road users located within the vicinity of the ego vehicle 102. The vehicle autonomous controller 112 and/or the ECU 104 may communicate with one or more of the control units of the ego vehicle 102 to thereby control the ego vehicle 102 to enable the ego vehicle 102 to be operated in a manner that accounts for the one or more highly important road users to safely navigate within the vicinity of the ego vehicle 102.

As an illustrative example, the fusion control module 134 may determine one or more discrete actions with respect to the autonomous operation of the ego vehicle 102 that may be communicated to the vehicle autonomous controller 112 to operate the ego vehicle 102 in manner that accounts for the locations, positons, and/or trajectories of the one or more highly important road users located within the vicinity of the ego vehicle 102. More specifically, the ego vehicle 102 may be controlled to execute one or more discrete actions that may be conducted in a particular manner(s) (e.g., with the application of a particular speed, acceleration, steering angle, throttle angle, braking force, etc.) to account for the one or more highly important road users. For instance, the ego vehicle 102 may be autonomously controlled to slow down and stop using a specific braking force to safely navigate within the vicinity of the ego vehicle 102 when making a left turn maneuver through an intersection (as shown in FIG. 2).

Figure 7:
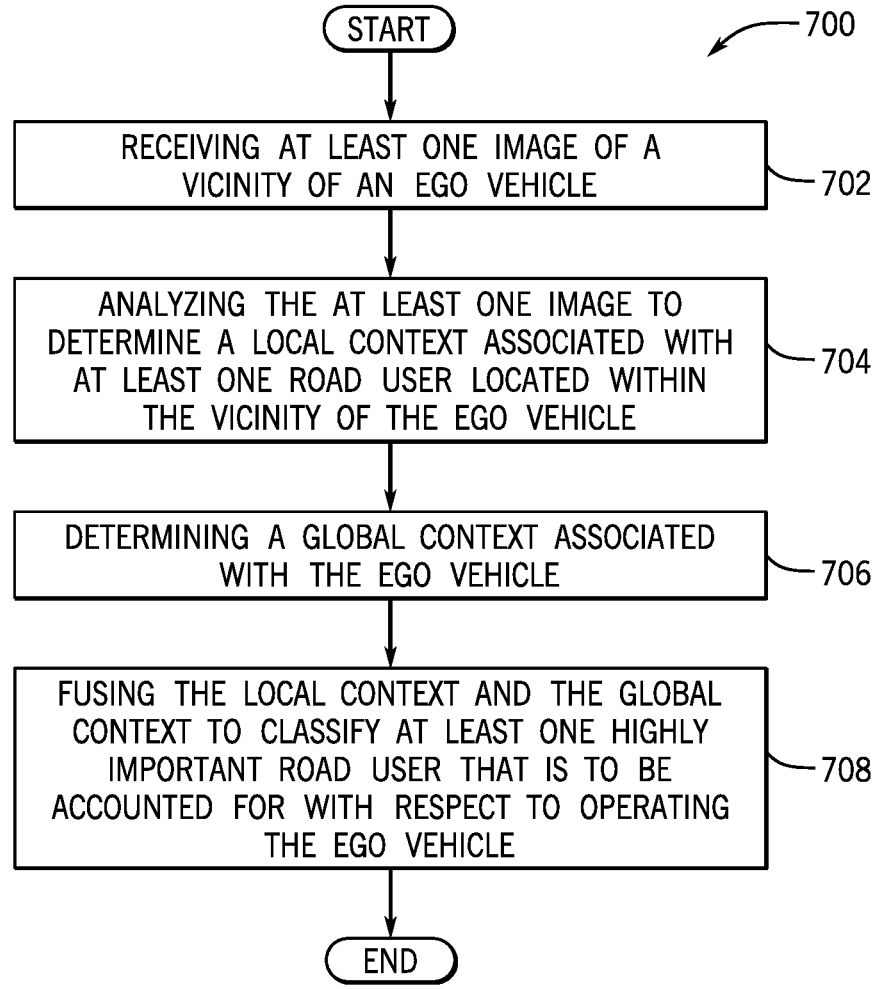
FIG. 7 is a process flow diagram of a method for providing context aware road user importance estimation according to an exemplary embodiment of the present disclosure.

FIG. 7 is a process flow diagram of a method 700 for providing context aware road user importance estimation according to an exemplary embodiment of the present disclosure. FIG. 7 will be described with reference to the components of FIG. 1 though it is to be appreciated that the method 700 of FIG. 7 may be used with other systems/components. The method 700 may begin at block 702, wherein the method 700 may include receiving at least one image of a vicinity of an ego vehicle 102.

The method 700 may proceed to block 704, wherein the method 700 may include analyzing the at least one image to determine a local context associated with at least one road user located within the vicinity of the ego vehicle 102. In one embodiment, at least one potentially important road user is selected with respect to the ego vehicle 102. The method 700 may proceed to block 706, wherein the method 700 may include determining a global context associated with the ego vehicle 102. In one embodiment, the global context includes a predicted future path of the ego vehicle 102. The method 700 may proceed to block 708, wherein the method 700 may include fusing the local context and the global context to classify at least one highly important road user that is to be accounted for with respect to operating the ego vehicle.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing context aware road user importance estimation, comprising:
   receiving at least one image of a vicinity of an ego vehicle;
   analyzing the at least one image to determine a local context associated with at least one road user located within the vicinity of the ego vehicle, wherein at least one potentially important road user is selected with respect to the ego vehicle based on a computation and refinement of at least one bounding box around the at least one road user located within the vicinity of the ego vehicle;
   determining a global context associated with the ego vehicle, wherein the global context includes a predicted future path of the ego vehicle; and
   fusing the local context and the global context to classify at least one highly important road user that is to be accounted for with respect to operating the ego vehicle.

2. The computer-implemented method of claim 1, wherein receiving at least one image of the vicinity of the vehicle includes receiving image data, wherein the image data is analyzed to determine a physical location of the at least one road user with respect to the ego vehicle.

3. The computer-implemented method of claim 1, wherein analyzing the at least one image to determine the local context includes determining at least one set of image coordinates that are associated with the at least one road user and computing the at least one bounding box around the at least one road user.

4. The computer-implemented method of claim 3, wherein determining the local context associated with the at least one road user includes performing important road user proposal generation to select the at least one potentially important road user.

5. The computer-implemented method of claim 4, wherein determining the local context associated with the at least one road user includes predicting a class-agnostic objectness score, wherein the at least one bounding box is refined and annotated with at least one class label that is associated with the selection of the at least one potentially important road user.

6. The computer-implemented method of claim 1, wherein determining the local context associated with the at least one road user includes computing a local appearance feature associated with the at least one potentially important road user, wherein the local appearance feature includes rich information about at least one of: an orientation, dynamics, an intention, and a distance that pertain to the at least one potentially important road user.

7. The computer-implemented method of claim 1, wherein determining the local context associated with the at least one road user includes computing a location feature associated with the at least one road user, wherein the location feature includes a correlation between proximity, mass, and importance with respect to the at least one potentially important road user.

8. The computer-implemented method of claim 1, wherein determining the global context associated with the ego vehicle includes receiving vehicle sensor data and utilizing values extracted from the vehicle sensor data to construct a future path vector associated with the ego vehicle based on the values and a context feature of the at least image.

9. The computer-implemented method of claim 1, wherein fusing the local context and the global context includes analyzing data associated with the local context and the global context and extracting local features and global features, wherein the local features and global features are concatenated and analyzed to classify the at least one potentially important road user as the at least one highly important road user.

10. A system for providing context aware road user importance estimation, comprising:
a memory storing instructions when executed by a processor cause the processor to:
receive at least one image of a vicinity of an ego vehicle;
analyze the at least one image to determine a local context associated with at least one road user located within the vicinity of the ego vehicle, wherein at least one potentially important road user is selected with respect to the ego vehicle based on a computation and refinement of at least one bounding box around the at least one road user located within the vicinity of the ego vehicle;
determine a global context associated with the ego vehicle, wherein the global context includes a predicted future path of the ego vehicle; and
fuse the local context and the global context to classify at least one highly important road user that is to be accounted for with respect to operating the ego vehicle.

11. The system of claim 10, wherein receiving at least one image of the vicinity of the vehicle includes receiving image data, wherein the image data is analyzed to determine a physical location of the at least one road user with respect to the ego vehicle.

12. The system of claim 10, wherein analyzing the at least one image to determine the local context includes determining at least one set of image coordinates that are associated with the at least one road user and computing the at least one bounding box around the at least one road user.

13. The system of claim 12, wherein determining the local context associated with the at least one road user includes performing important road user proposal generation to select the at least one potentially important road user.

14. The system of claim 13, wherein determining the local context associated with the at least one road user includes predicting a class-agnostic objectness score, wherein the at least one bounding box is refined and annotated with at least one class label that is associated with the selection of the at least one potentially important road user.

15. The system of claim 10, wherein determining the local context associated with the at least one road user includes computing a local appearance feature associated with the at least one potentially important road user, wherein the local appearance feature includes rich information about at least one of: an orientation, dynamics, an intention, and a distance that pertain to the at least one potentially important road user.

16. The system of claim 10, wherein determining the local context associated with the at least one road user includes computing a location feature associated with the at least one road user, wherein the location feature includes a correlation between proximity, mass, and importance with respect to the at least one potentially important road user.

17. The system of claim 10, wherein determining the global context associated with the ego vehicle includes receiving vehicle sensor data and utilizing values extracted from the vehicle sensor data to construct a future path vector associated with the ego vehicle based on the values and a context feature of the at least image.

18. The system of claim 10, wherein fusing the local context and the global context includes analyzing data associated with the local context and the global context and extracting local features and global features, wherein the local features and global features are concatenated and analyzed to classify the at least one potentially important road user as the at least one highly important road user.

19. A non-transitory computer readable storage medium storing instructions that when executed by a computer, which includes a processor perform a method, the method comprising:
receiving at least one image of a vicinity of an ego vehicle;
analyzing the at least one image to determine a local context associated with at least one road user located within the vicinity of the ego vehicle, wherein at least one potentially important road user is selected with respect to the ego vehicle based on a computation and refinement of at least one bounding box around the at least one road user located within the vicinity of the ego vehicle;
determining a global context associated with the ego vehicle, wherein the global context includes a predicted future path of the ego vehicle; and
fusing the local context and the global context to classify at least one highly important road user that is to be accounted for with respect to operating the ego vehicle.

20. The non-transitory computer readable storage medium of claim 19, wherein fusing the local context and the global context includes analyzing data associated with the local context and the global context and extracting local features and global features, wherein the local features and global features are concatenated and analyzed to classify the at least one potentially important road user as the at least one highly important road user.

* * * * *